United States Patent Office 3,493,655
Patented Feb. 3, 1970

3,493,655
METHOD OF CONTROLLING INSECTS WITH O,O,O',O' - TETRA - LOWER ALKYL - O,O'- DITHIO-DI - P - PHENYLENE-PHOSPHORO- THIOATES
Richard Joseph Magee, Princeton, N.J., assignor to American Cyanamid Company, Stamford, Conn., a corporation of Maine
No Drawing. Original application May 26, 1966, Ser. No. 553,017. Divided and this application Feb. 3, 1969, Ser. No. 796,227
Int. Cl. C07f 9/18, 9/12; A01n 9/36
U.S. Cl. 424—204    2 Claims

ABSTRACT OF THE DISCLOSURE

Novel phosphorus-containing esters of the formula

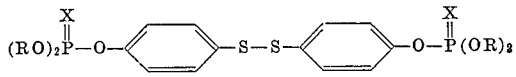

wherein R is lower alkyl $C_1$–$C_4$ and X is S or O are disclosed as is their use in controlling insects.

---

This application is a division of application Ser. No. 553,017 filed May 26, 1966.

This invention relates to novel insecticidally effective phosphorus-containing esters, to their method of preparation and to their use as insecticides. More particularly, this invention relates to compounds of the formula

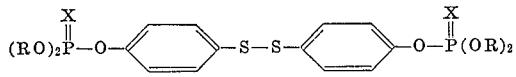

wherein R is lower alkyl, i.e., methyl, ethyl, propyl, butyl and the like, X is S or O, to the process of preparation of such compounds and to their use for controlling insects.

Compounds of the above formula may be prepared by reacting, 4,4'-dithiodiphenol with an O,O-di(lower alkyl)-phosphorohalate or O,O-di(lower alkyl)phosphorohalothioate in an organic solvent such as t-butanol, methylisobutylketone, methylethylketone or the like in the presence of a strong base as for example potassium t-butoxide, sodium methoxide, sodium hydroxide and the like.

Graphically the reaction may be illustrated as follows:

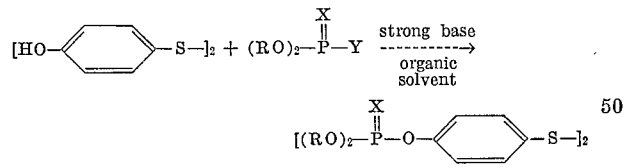

wherein Y is halogen such as chloro or bromo, R is lower alkyl and X is O or S.

The reagents employed are well known. Thus the phenol having the formula

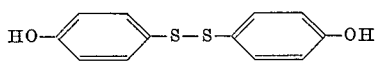

is readily prepared by the procedure of R. Levckait, J. Prakt. Chem. 23, 211, 179–223, (1890) and the dialkylphosphorohalothioates are described in a multiplicty of literature references.

A satisfactory production of the above-described compounds is obtained when the ratio of phenol to dialkylphosphorohalate or halothioate to base is about 1:2:2 and the reaction is carried out at a temperature of from between about 40° and 100° C.

Other methods for preparing the above compounds involving the same intermediates are also suitable.

Solvents which may be employed in the above-described preferred process include in addition to those already re-cited diethyl ether, benzene, toluene, acetone, methylisobutylketone, and chloroform. Other acid acceptors that may be employed include sodium carbonate, pyridine, lutidine, triethylamine and the like. The reaction may be conducted in the absence of an acid acceptor if conditions are such that the acid released by the reaction is efficiently removed as by distillation.

The compounds of this invention have been found to be highly effective insecticides and larvacides and are particularly well adapted for use in agricultural and public health applications.

As an insecticide, it may be applied as a dust, spray, emulsion, wettable powder and the like. As a spray, it may be employed in organic solvents. Additionally, as a spray it may be employed with lower monohydric aliphatic alcohols, ketone alcohols such as diacetone alcohol and in various esters and aromatic hydrocarbons. It may be employed as an emulsion in water or other non-solvents to which suitable surfactants, wetting agents, or emulsifying agents have been added. It may be applied on solid carriers, such as talcs and clays, as for example kaolin clay or fuller's earth, or on such carriers as chalk, wood flour, silica, charcoal, activated carbon or other inert powders. As a wettable powder, the compound of this invention may be applied to easily wettable carrier materials, such as attaclay, with or without the aid of surfactants, or on less readily wettable carriers in combination with suitable surfactants.

In use, the compounds of this invention may be applied to the insects or insect larvae in effective amounts or in an amount toxic to the insect or larvae, the term "applied" being intended to include applications to their habitats and breeding areas or to organic matter, living or dead, such as plant life, which forms the feed of the insect.

In order that the present invention may be more fully understood, the following examples are given primarily by way of illustration. No specific details or enumeration contained therein should be construed as limitations on the present invention. All parts and percentages are by weight unless otherwise specifically designated.

EXAMPLE 1

Preparation of O,O,O',O'-tetramethyl O,O'-dithiodi-p-phenylene phosphorothioate

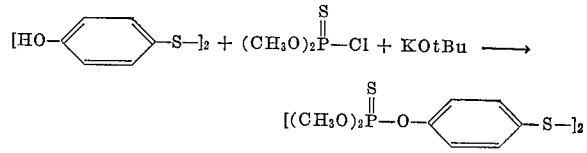

11.5 grams of 4,4-dithio-diphenol is dissolved in 150 milliliters of t-butanol along with the 16.3 grams of O,O-dimethyl phosphorochloridothioate and heated to 40°. 100 milliliters of t-butanol containing the 11.3 grams of potassium t-butoxide (KOtBu) is added and the temperature of the mixture rises to 50°. The mixture is then heated to reflux for 15 minutes and then stripped by vacuum distillation. The residue is partitioned in an ether/water mixture, then dried and stripped to give 23.5 grams of oil which in turn is washed with hexane and stripped to give 21.1 grams of a free flowing orange oil, which has the following analysis:

Calc. for $P_2S_4O_6C_{16}H_{20}$: C, 38.55%; H, 4.04%; S, 25.73%; P, 12.43%. $n_D^{25}$+1.5814. Found: C, 38.59%; H, 4.08%; S, 25.77%; P, 12.26%.

Employing the above procedure and substituting O,O-diethyl phosphorochloridothioate for O,O-dimethyl phosphorochloridothioate yields O,O,O',O'-tetraethyl O,O'-dithio-di-p-phenylene phosphorothioate.

Similarly, substituting O,O-dipropyl phosphorochloridate or O,O-diisopropyl phosphorochloridothioate for O,O-dimethyl phosphorochloridothioate yields the corresponding O,O,O',O'-tetrapropyl O,O'-dithiodi-p-phenylene phosphate and O,O,O',O'-tetraisopropyl O,O'-dithiodi-p-phenylene phosphorothioate.

EXAMPLE 2

The effectiveness of the compounds of the instant invention is demonstrated by the following test wherein O,O,O',O'-tetramethyl O,O'-dithiodi-p-phenylene phosphorothioate is prepared as a 0.1% solution in a 65% acetone/35% water mixture. Sieva lima bean plants are dipped in the test solution and placed in a hood to dry. When dry they are placed in four-inch petri dishes upon a moist filter paper and ten third-instar Southern armyworm (*Prodenia eridania* Cram.) larvae about ⅜ inch long are added to each dish. The dishes are covered and held at 80° F. and 60% R.H. for two days. They are then examined and mortality counts made. With the above-named composition, which is representative of the compounds disclosed, 90% kill of the armyworms is achieved.

The compounds of the invention are also effective for control of other insect larvae including aquatic larvae such as midge and mosquito larvae when applied at the rate of about 0.1% or more.

EXAMPLE 3

The insecticidal activity of the compounds of the invention is further demonstrated by the following test wherein the compound to be tested is made up as .1% and .01% solutions of active ingredient at 50% acetone/35% water mixtures. Three-inch pots containing Nasturtium plants approximately aphids (*Aphis fabae* L.) are placed on a turntable and sprayed with test solution. The sprayed plants are then laid on their sides on white enamel trays which have had the edges coated with oil to prevent escape of the Nasturtium aphids. Two days after spraying, the plants are examined and mortality counts made. At both concentrations mentioned above, 100% kill is obtained with the compound O,O,O',O'-tetramethyl O,O'-dithiodi-p-phenylene phosphorothioate.

EXAMPLE 4

To determine the effectiveness of the compounds of the invention against the German cockroach (*Blattella germanica* L.) a dust containing 1.0% of O,O,O',O'-tetramethyl O,O' - dithiodi-p-phenylene phosphorothioate is sprinkled evenly over the bottom of a seven-inch dish and twenty adult German cockroaches are added. The dishes are then covered and water is supplied by means of a two-ounce bottle and a cotton wick. The dishes are then placed in a constant temperature and humidity room and held for three days at 80° F. and 60% R.H. after which mortality counts are made and the results recorded. With the above-named compound, 100% kill is achieved.

I claim:
1. A method of controlling insects comprising contacting said insects with an insecticidally effective amount of a compound of the formula

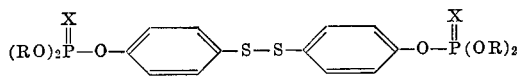

wherein R is lower alkyl $C_1$–$C_4$ and X is S or O.

2. A method of controlling aquatic larvae comprising contacting said larvae with a larvicidally effective amount of a compound according to claim 1.

References Cited

UNITED STATES PATENTS 2,833,805 5/1958 Diveley _____ 424—204
2,857,304 10/1958 Birum _____ 424—204

ALBERT T. MEYERS, Primary Examiner

D. R. MAHANAND, Assistant Examiner

U.S. Cl. X.R.

260—930; 424—168, 357